United States Patent [19]

Kitada

[11] Patent Number: 4,763,248
[45] Date of Patent: Aug. 9, 1988

[54] MICROCOMPUTER WITH A DETECTING FUNCTION OF A MEMORY ACCESS ERROR

[75] Inventor: Yoshitaka Kitada, Tokyo, Japan

[73] Assignee: NEC Corporation, Tokyo, Japan

[21] Appl. No.: 644,631

[22] Filed: Aug. 27, 1984

[30] Foreign Application Priority Data

Aug. 26, 1983 [JP] Japan .................. 58-156080

[51] Int. Cl.[4] .................................. G06F 11/00
[52] U.S. Cl. .................................. 364/200
[58] Field of Search ............ 371/21, 25, 19, 21; 364/200 MS File, 900 MS File

[56] References Cited

U.S. PATENT DOCUMENTS

| | | | |
|---|---|---|---|
| 4,061,908 | 12/1977 | de Jong et al. | 371/21 |
| 4,079,453 | 3/1978 | Dahl | 371/21 |
| 4,369,511 | 1/1983 | Kimura et al. | 371/21 |
| 4,546,429 | 10/1985 | Chan et al. | 364/200 |
| 4,553,225 | 11/1985 | Ohe | 371/21 |
| 4,583,163 | 4/1986 | Kobayashi et al. | 364/200 |

Primary Examiner—Thomas M. Heckler
Attorney, Agent, or Firm—Foley & Lardner, Schwartz, Jeffery, Schwaab, Mack, Blumenthal & Evans

[57] ABSTRACT

A microcomputer with a stored program memory has a detecting circuit for detecting a memory access error by which an unrequired code is read out of the memory. The detecting circuit receives a read-out instruction code from the memory according to memory access operation in parallel with a receiving operation of an instruction decoder and detects a read-out code from a memory location in which a program to be processed is not written. Undesired processing can be immediately inhibited and the operator can easily find the occurrence of the memory access error.

8 Claims, 1 Drawing Sheet

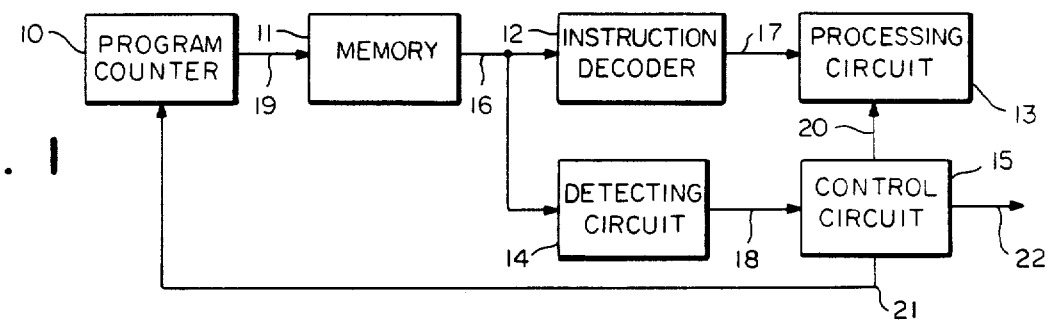
FIG. 1
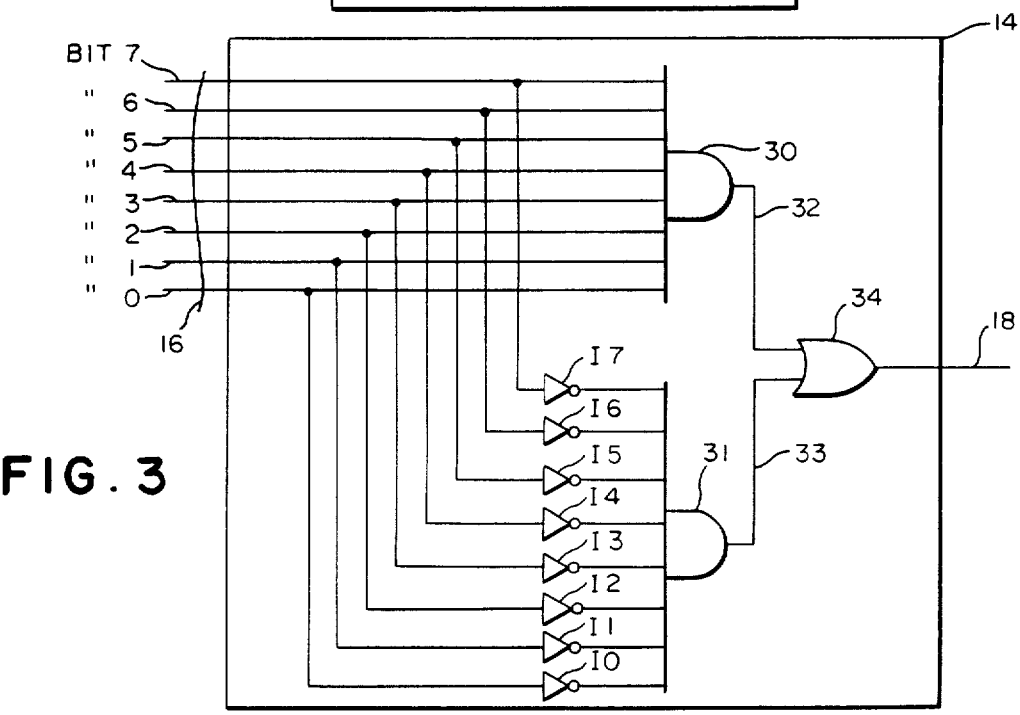
FIG. 2
FIG. 3

MICROCOMPUTER WITH A DETECTING FUNCTION OF A MEMORY ACCESS ERROR

FIELD OF THE INVENTION

The present invention relates to a microcomputer with a detecting function of a memory access error, and more particularly to a stored program microcomputer having a program memory in which a plurality of instruction codes are written according to a program.

DESCRIPTION OF THE PRIOR ART

Recently, a higher-level microcomputer has an error correcting function, by which a data including an error bit is corrected or is replaced by a correct data. This error correcting function is useful for data to be processed, but is unsuitable for errors of a program procedure or a processing sequence. These errors usually occur when an undesired instruction code is written into the program memory or when undesirable memory access is executed for the program memory. The former can be detected by a program debugging and can be corrected by restoring of a correct instruction code. With respect to the latter, however, its detection is very hard, because when undesirable memory access occurs and how undesirable memory access is executed can not be predicted.

The undesirable memory access occurs when an unrequired address different from the predetermined address sequence is applied to the program memory. In this condition, therefore, an undesired instruction code is read out of the program memory and is executed, so that an error processing is performed. For relatively simple error processing, the operator can find the cause of the error taking into consideration the result of the processing. However, it is rare that the operator can find the cause of error. It is very hard, in general, for the operator to find the error. Particularly, when the processing puts the microcomputer into the condition of a program stall or into a dead lock, the operator cannot generally determine the cause of the error.

In the stored program microcomputer, to find the above mentioned memory access error is particularly hard, because in practical use, the program memory has a larger capacity than that necessary for instructions contained in the programming. Therefore, the program memory involves memory locations wherein instruction codes are not written. These vacant memory locations can not be designated in a normal operation and their contents are uncertain. However, as described above, when a memory access error occurs, the vacant memory locations may be designated by an undesired address. Consequently, an uncertain code is read out of the program memory as an instruction code, so that an error processing is initiated.

Generally, a read-write memory (RAM) or a programmable memory (PROM) is used as a program memory in a stored program microcomputer. In an initial condition or in a condition before instruction codes are written thereinto, all 1's or all 0's are set in every memory cells of a program memory. If the program memory is an RAM, the memory content is lost when power is off, and all 1's or all 0's must be automatically or manually set thereinto. If the program memory is PROM, the memory content is erasable by means of ultraviolet rays, and all 1's must be set thereinto after a program stored therein is erased. Thus, where one instruction code consists of 8 bits (1 byte), 00(H) (H means Hexadecimal) or FF(H) (F means 15 of Hexadecimal) is stored in every memory address locations. In a microcomputer, 00(H) (that is, all bits "0") is used as a no operation (NOP) instruction code, while FF(H) (that is, all bits "1") is used as another instruction code, for example a data transmission instruction code. Therefore, after a program has been written into arbitrary memory locations of the above described memory 00(H) or FF(H) is stored in the remainder memory locations in which the program has not been written.

When the memory access error occurs, 00(H) code or FF(H) code is read out of the program memory and is executed. As a result, the NOP instruction or the data transmission instruction is executed at unrequired times, and thus the processing is placed into a dead loop. Particularly, when 00(H) code is read out by a memory access error, the operator can not detect this error. In a microcomputer, a program counter for addressing the program memory is automatically incremented by +1 every time one instruction is executed, and therefore when a plurality of 00(H) codes are stored at sequential addresses, the operator can not detect the address of the first 00(H) code.

SUMMARY OF THE INVENTION

It is therefore an object of the present invention to provide a microcomputer with a memory for storing instructions, in which a memory access error can be easily detected during program running.

Another object of the present invention is to provide a microprocessor which can be employed as a debugging tool, a program development tool, or the like.

Another object of the present invention is to provide a stored program computer which can detect an erroneous memory designating a memory location storing no program and can stop the program processing.

Still another object of the present invention is to provide a processor for sequentially performing instructions read out of a memory, in which a predetermined routine is automatically selected in response to an error detection.

Still another object of the present invention is to provide a microprocessor, incorporating a program memory, which can detect an address of a memory access error.

According to the present invention, a microcomputer comprises a memory for storing instruction codes, a memory access means for reading instruction codes one by one out of the memory, a processing means for performing a program in accordance with read-out instruction code, a detecting circuit coupled to output a portion of the memory for detecting whether a read-out instruction code is 00(H) or not or is FF(H) or not, and for producing a detecting signal when the read-out instruction code is 00(H) or FF(H), and a control circuit receiving the detecting signal and designating a predetermined processing for an error occurrence. The predetermined processing in response to the detection of 00(H) or FF(H) includes indicating that a memory access error has occurred, stopping the program processing at the time when the error is detected, inhibiting advance of a program counter in the memory access means, or changing the program processing to a predetermined processing.

According to the present invention, since the detecting circuit is newly provided therein, a memory access error, by which undesired memory location is accessed, can be easily and automatically detected under program processing. Further, the detecting circuit is provided so as to check all instruction codes read out of the memory, so that the memory access error can be discovered before an unrequired instruction is executed. Therefore, the microcomputer is protected from being put into a dead loop or a dead lock.

The present invention can be applied to any microcomputer, such as a single chip microcomputer having a memory therein or a microprocessor to which at least one external memory chip is coupled by means of an external bus. With respect to the latter case, the detecting circuit may be incorporated into either a microprocessor chip or an external memory chip. Further, the present invention is very useful in program debugging, program development, evaluation, or the like.

BRIEF DESCRIPTION OF THE DRAWINGS

FIG. 1 is a block diagram indicating a principal part of a microcomputer according to the present invention;

FIG. 2 is a program memory map which can be employed in a microcomputer of the present invention;

FIG. 3 is a logical circuit block diagram of a detecting circuit of a microcomputer shown in FIG. 1.

DETAILED DESCRIPTION OF THE PREFERRED EMBODIMENTS

FIG. 1 shows a block diagram of a principal part of a microcomputer according to an embodiment of the present invention. A microcomputer includes, in general, a memory access means such as a program counter 10, a program memory 11, an instruction decoder 12 and a processing circuit 13. The program counter 10 generates sequential addresses 19 one by one except for a jump operation or a branch operation. The program memory 11 stores instruction codes for processing a program, and these instruction codes are read out one by one in a memory access cycle by means of the addresses from the program counter 10. A read-out instruction code 16 is entered into the instruction decoder 12 and is decoded. The decoded instruction is applied to the processing circuit 13 which executes the program according to the decoded signals.

The present invention has further a newly added detecting circuit 14 which is coupled to an output side of the program memory, so that the circuit 14 receives read-out instruction codes one by one in the same input operation as that of the instruction decoder 12. This detecting circuit 14 has the function of detecting an unrequired code immediately when it is read out of the program memory 11 as a memory access error. This function is very important because the program memory 11 cannot sense an application of an error address which has been generated by a memory access error. The detecting circuit 14 produces a detecting signal along line 18 when the unrequired code is detected by the detecting function. As described above, since the unrequired code is an error code which is not to be read out of the program memory 11 in a normal processing mode, the processing circuit 13 should not execute an operation according to this error code.

In FIG. 1, a control circuit 15 generates a control signal along line 20 to inhibit operation of the processing circuit 13 in response to the detecting signal along line 18. In addition to or in place of the control signal along line 20 the control circuit 15 may generate a control signal along line 21 to stop the increment operation of the program counter 10. Thus the program counter 10 holds the error address therein, and therefore a cause of the error is easily resolved by examining the content of the program counter 10. Furthermore, the control circuit 15 may generate a signal along line 22 for indicating to an operator that a memory access error has occurred.

Now, it is assumed that the program memory 11 stores instruction codes as shown in FIG. 2 which illustrates a memory map of a program. In FIG. 2, the program memory 11 has, for example, a capacity of m bites. A LOAD instruction is set at addresses 0 through 2, an ADD instruction at an address 3, a JUDGE instruction at an addresses 4 and 5, a JUMP instruction at an address 6, a LOAD instruction at addresses 7 through 9, a JUDGE instruction at addresses n and n+1 and an END instruction at an address n+2. The remainder addresses are not used in this program, and therefor unknown codes xx . . . x are set therein.

In a normal mode, the program counter 10 sequentially generates addresses 0 through n+2 one by one in every memory access cycle. The program memory 11 receives these addresses and outputs instruction codes one byte by one byte to the instruction decoder 12. The decoder 12 decodes the read-out instruction codes and sends decoded signals to the processing circuit 13. The processing circuit 13 executes the program stored in the program memory 11 according to the decoded outputs along lines 17.

Now, when an address n+4 is erroneously generated, and is applied to the program memory 11 by a memory access error, an unknown code xxx . . . x is read out of the program memory 11, and therefore the processing circuit 13 executes an unrequired operation if the detecting circuit is not provided. However, according to the present invention, this unknown code is detected by the detecting circuit 14, and thus, the unrequired operation can be inhibited by the control signal along line 20 from the control circuit 15. Any advance of the program counter 10 may be inhibited by the control signal along line 21, and therefore the program counter 10 retains the address n+4.

Where the contents at addresses n+3 through m of the program memory 11 are set all to "0" or all to "1" as described before, the detecting circuit 14 is constructed as shown in FIG. 3. Namely, the circuit 14 includes two AND gates 30 and 31 and an OR gate 34. The AND gate 30 receives the read-out instruction code (bit 0 through bit 7), while the AND gate 31 receives the inverted code of the read-out instruction code by means of inverters $I_0$ through $I_7$. Therefore, the AND gate 30 produces a "1" signal 32 when the read-out instruction code is all 1's while the AND gate 31 produces a "1" signal 33 when the read-out instruction code is all 0's. Thus, both the code all 0's code and all 1's are automatically detected by these AND gates 30 and 31, and the detecting signal is sent through the OR gate 34 along line 18 to the control circuit 15. The control circuit 15 may be a flip-flop circuit which is set in response to the detecting signal along line 18.

As described above, according to the present invention as shown in FIGS. 1 and 3, when a memory location storing an unknown code unnecessary for a program is selected by a memory access error, the detecting signal is immediately generated from the detecting circuit 14 coupled to the program memory. Therefore, a miss execution according to the memory access error is inhibited easily, and the operator can find the error occurrence.

Further, if the program memory 11 contains a program of operation which should be executed when an erroneous operation or abnormal operation occurs the control circuit 15 may set a start address of that program in the program counter 10. In this case, a content of the program counter 10 when the memory access error has occurred is replaced by the start address and the mentioned program to be executed. However, if an error address in the program counter 10 is required, a stack register may be further provided in the microcomputer. The stack register is coupled to the program counter 10 and receives the error address before the start address is set in the program counter 10 to replace it. Further when the mentioned program is executed, the control signal along line 20 to stop the processing circuit 13 is neglected. The signal along line 22 may be used to display an error message on a display device or to activate a buzzer or the like to indicate to the operator that a memory access error occurs.

Moreover, the detecting circuit 14 may be constructed such that the detecting signal along line 18 is generated according to a comparison operation of the read-out code with a predetermined code indicating an error code.

It should be noted that the all "0" code or the all "1" code are not used as a normal instruction code in the above described embodiment.

What is claimed is:

1. A microcomputer comprising:
    a memory having a plurality of memory locations, each memory location consisting of a plurality of bits, a plurality of program instruction codes containing both "0" and "1" bits being stored in a portion of said memory locations and the remaining portion of said memory locations storing a predetermined code wherein said predetermined code is not a program instruction code;
    a memory access means coupled to said memory for applying an address to said memory to select one of said plurality of memory locations for reading a plurality of bits of the selected memory location;
    an instruction decoding means coupled to said memory for decoding the plurality of bits of the selected memory location read out of said memory;
    a processing means coupled to said instruction decoding means for executing a processing operation in response to an output of said instruction decoding means;
    a detecting means coupled to said memory for receiving the plurality of bits of the selected memory location read out of said memory to detect said predetermined code for generating a detection signal which indicates that a memory access error has occurred when the predetermined code is detected; and
    a control means coupled to said detecting means for starting an error operation in response to said detection signal.

2. A microcomputer as claimed in claim 1, in which said control means is coupled to said processing means and applies a stop signal to said processing means for stopping an operation of said processing means when said detection signal is generated.

3. A microcomputer as claimed in claim 1, in which said control means is coupled to said memory access means and applies a hold signal to said memory access means for holding said address of said selected memory location storing said predetermined code.

4. A microcomputer as claimed in claim 1, in which said control means outputs an error display signal to indicate a memory access error to an operator.

5. A microcomputer as recited in claim 1, wherein said predetermined code is all 1's.

6. A microcomputer as recited in claim 1, wherein said predetermined code is all 0's.

7. A microcomputer comprising:
    a memory having an instruction code area wherein a plurality of instruction codes are stored and a non-instruction code area wherein a code or codes different from the instruction codes, namely, non-instruction codes, are stored,
    a memory access circuit coupled to said memory and reading a code out of said memory by applying an address to said memory,
    a detecting circuit coupled to said memory and detecting whether the code read out of said memory is an instruction code or a non-instruction code, said detecting circuit generating a detection signal when the code is the non-instruction code, said detection signal indicating a memory access error which occurs when said memory access circuit accesses said non-instruction code,
    an instruction decoder coupled to said memory for decoding the code read-out from said memory,
    a processing circuit coupled to said instruction decoder for executing a processing operation in response to an output of said instruction decoder, and
    a control circuit coupled to said detecting circuit for stopping an operation of said processing circuit in response to said detection signal.

8. A microcomputer as claimed in claim 7, in which said non-instruction code consists of a plurality of the same bits.

* * * * *